United States Patent
Kim (10) Patent No.: US 7,477,881 B2
(45) Date of Patent: Jan. 13, 2009

(54) INTERMEDIATE FREQUENCY RECEIVER WITH IMPROVED IMAGE REJECTION RATIO

(75) Inventor: Jae-Wan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 11/193,713

(22) Filed: Jul. 29, 2005

(65) Prior Publication Data

US 2006/0035617 A1   Feb. 16, 2006

(30) Foreign Application Priority Data

Aug. 13, 2004   (KR) ...................... 10-2004-0064063

(51) Int. Cl.
*H04B 1/10*      (2006.01)
*H04B 1/26*      (2006.01)

(52) U.S. Cl. ........................ 455/130; 455/283; 455/296; 455/323; 375/324; 375/346

(58) Field of Classification Search ... 455/232.1–251.1, 455/283–285, 295–296, 308–326, 336–337; 375/324–328, 345–346, 319
See application file for complete search history.

(56) References Cited

U.S. PATENT DOCUMENTS

| | | | |
|---|---|---|---|
| 6,044,112 A * | 3/2000 | Koslov ........................ 375/235 |
| 6,099,317 A * | 8/2000 | Bullwinkel et al. ......... 434/118 |
| 6,137,999 A * | 10/2000 | Lovelace et al. ............ 455/302 |
| 6,340,883 B1 * | 1/2002 | Nara et al. ................ 324/76.78 |
| 6,366,622 B1 * | 4/2002 | Brown et al. ................. 375/322 |
| 6,560,449 B1 | 5/2003 | Liu ............................ 455/302 |
| 6,574,287 B1 * | 6/2003 | Swaminathan et al. ...... 375/320 |
| 7,146,146 B2 * | 12/2006 | Masenten et al. ........... 455/296 |
| 7,158,586 B2 * | 1/2007 | Husted ........................ 375/324 |
| 7,254,379 B2 * | 8/2007 | Xu et al. ..................... 455/296 |
| 2003/0165203 A1 * | 9/2003 | Mohindra .................... 375/324 |
| 2003/0231723 A1 * | 12/2003 | Hansen ........................ 375/343 |
| 2004/0002323 A1 | 1/2004 | Zheng |
| 2005/0239428 A1 * | 10/2005 | Seendripu et al. ........... 455/280 |
| 2006/0252399 A1 * | 11/2006 | Paulus ......................... 455/302 |

* cited by examiner

*Primary Examiner*—Simon D Nguyen
(74) *Attorney, Agent, or Firm*—Monica H. Choi (57) ABSTRACT

An intermediate frequency receiver includes mixers for generating first and second IF signals from a RF signal and local oscillator signals. A magnitude calibration loop adjusts a gain of the first and/or second IF signals generated from the mixers depending on a magnitude difference between the IF signals. The phase calibration loop adjusts a phase of a local oscillator signal before being used at the mixers depending on a phase difference between the IF signals.

21 Claims, 10 Drawing Sheets

INTERMEDIATE FREQUENCY RECEIVER WITH IMPROVED IMAGE REJECTION RATIO

BACKGROUND OF THE INVENTION

This application claims priority to Korean Patent Application No. 2004-64063 filed on Aug. 13, 2004 in the Korean Intellectual Property Office (KIPO), the entire contents of which are hereby incorporated by reference.

1. Field of the Invention

The present invention relates to an intermediate frequency receiver with magnitude and phase calibration of intermediate frequency signals for improved image rejection ratio.

2. Description of the Related Art

With rapid development of wireless communication and IC design technology, the design and implementation of radio frequency (RF) transceiver systems have evolved greatly. The RF transceiver system is desired to be designed with high degree of integration, a small-sized chip, and low power consumption. Such RF transceiver systems may be mainly categorized into a zero-IF (Intermediate Frequency) architecture and a low-IF architecture.

The low-IF architecture uses an intermediate frequency that is about 1 to 2 times lower than a signal bandwidth. The low-IF architecture is less influenced by DC offset and 1/f noise than the zero-IF architecture. However, in the low-IF receiver architecture, the desired RF signal may be influenced by the image signal having a frequency very close to the desired RF signal. Thus, the image signal should be removed for maintaining receiver performance.

Generally, two mechanisms for image rejection in a low-IF receiver are referred to as the "Hartely, Weaver image-rejection architecture" and the "polyphase image rejection filter". However, adequate image rejection is still difficult to achieve from IQ gain mismatch and phase mismatch.

Thus, a LMS (Least Mean Square) algorithm and a technique for calibrating gain and phase using a digital compensation algorithm have been proposed. The LMS algorithm is disclosed in IEEE journal of solid-state circuits, Vol. 38, No. 2, February 2003, entitled "A 2-GHz CMOS Image-Rejection Receiver with LMS Calibration" by Lawrence Der and Behzad Razavi. The technique for calibrating gain and phase using a digital compensation algorithm is disclosed in Microwave Symposium Digest, and 2002 IEEE MTT-S International, Vol. 2, pp. 792-802, June 2002, entitled "Architecture and Algorithm for High Precision Image Rejection and Spurious Rejection Mixers Using Digital Compensation" by Youngjin Kim et al.

The conventional calibration circuit employing the LMS algorithm includes three 11-bit DACs, and the conventional calibration circuit employing the digital compensation algorithm includes two 12-bit ADC. Accordingly, such conventional calibration circuits occupy relatively large chip space and have increased power consumption. In a conventional calibrating circuit and method for improving image rejection ratio IRR, a digital unit performs a calibrating operation using a high resolution ADC or DAC. Therefore, the digital unit occupies a relatively large chip space and has increased power consumption.

U.S. Pat. No. 6,137,999 to Lovelace et al. discloses an image reject transceiver, but teaches only adjustment of an intermediate frequency signal generated after transmission from a mixer. U.S. Pat. No. 6,560,449 to Liu discloses image-rejection I/Q demodulators, but teaches only adjustment of local oscillator signals generated before transmission through a mixer. U.S. Patent Application No. 2004/0002323 to Zheng discloses an image rejection down conversion system, but teaches only adjustment of intermediate frequency signals generated after transmission from mixers.

SUMMARY OF THE INVENTION

In contrast to the prior art, embodiments of the present invention are directed to using a novel combination of adjusting both at least one local oscillator signal before transmission through the mixers and at least one IF signal after transmission from the mixers for calibration of magnitude and phase of the IF signals.

In one embodiment of the present invention, an intermediate frequency receiver includes mixers, a magnitude calibration loop, and a phase calibration loop. The mixers generate first and second IF (intermediate frequency) signals from a RF (radio frequency) signal and local oscillator signals. The magnitude calibration loop adjusts a respective gain for each of at least one of the first and second IF signals generated after transmission from the mixers, depending on a difference between magnitudes of the first and second IF signals. The phase calibration loop adjusts a respective phase of each of at least one of the local oscillator signals generated before transmission through the mixers, depending on a phase difference between the first and second IF signals.

In another embodiment of the present invention, the mixers include first and second mixers. The first mixer mixes the RF signal with an in-phase local oscillator signal to generate the first IF signal, and the second mixer mixes the RF signal with a quadrature-phase local oscillator signal to generate the second IF signal.

In a further embodiment of the present invention, the intermediate frequency receiver further includes a local oscillator for generating the in-phase and quadrature-phase local oscillator signals.

In another embodiment of the present invention, the intermediate frequency receiver further includes an image rejection filter that receives the first and second IF signals after being amplified for removing image frequency components from the IF signals.

In an example embodiment of the present invention, the magnitude calibration loop includes a magnitude detector and a gain controller. The magnitude detector generates a respective DC voltage representing a respective magnitude of each of the IF signals. The gain controller generates a control signal for controlling the respective gain for each of at least one of the first and second IF signals from comparing the respective DC voltages.

In another embodiment of the present invention, the intermediate frequency receiver further includes a first gain amplifier for amplifying the first IF signal with a first gain and a second gain amplifier for amplifying the second IF signal with a second gain. The control signal from the gain controller is coupled to the second gain amplifier for adjusting the second gain depending on the control signal.

In a further embodiment of the present invention, the phase calibration loop includes a limiter, a phase detector, and a charge pump. The limiter limits a DC offset of the IF signals that are amplified. The phase detector determines the phase difference between the IF signals that are amplified. The charge pump generates a control voltage depending on the phase difference between the IF signals that are amplified. In that case, at least one varactor is coupled to a local oscillator for generating the local oscillator signals, and the control voltage from the charge pump controls the at least one varactor for adjusting a phase of at least one of the local oscillator signals depending on the control voltage.

In this manner, analog circuit elements are used for calibration of the magnitude and phase relationships of the IF signals for reduced chip area and power consumption. In addition, embodiments of the present invention provide a unique combination of adjusting at least one local oscillator signal before transmission through the mixers for calibrating phase and adjusting at least one IF signal after transmission from the mixers for calibrating magnitude. Such adjustment of both types of signals may result in improved calibration.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, 9, 10, 11, and 12 refer to elements having similar structure and/or function.

DETAILED DESCRIPTION OF THE INVENTION

Detailed illustrative embodiments of the present invention are disclosed herein. However, specific structural and functional details disclosed herein are merely representative for purposes of describing example embodiments of the present invention. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 1:
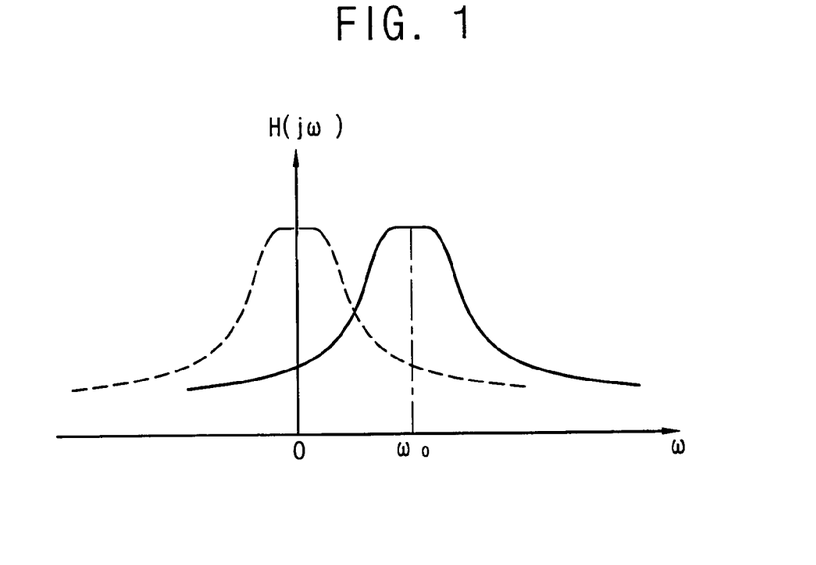
FIG. 1 shows a frequency response of a low pass filter (LPF)

FIG. 1 shows a frequency response of a low pass filter (LPF). In a real system, the frequency response of the LPF is symmetric with respect to a DC component as shown with a dotted line of FIG. 1. Thus, a real LPF passes positive frequency components (desired signals) and negative frequency components (image signals).

In order to remove an image signal, a polyphase image rejection filter is used. Such a polyphase image rejection filter may convert the frequency response of the LPF (represented in a dotted line) to a shifted frequency response (represented as a solid line in FIG. 1) by performing a frequency shift operation. When a transfer function of the LPF represented in the dotted line is H(jw), a transfer function of the polyphase image rejection filter represented in the solid line is H(j(w-wo)).

Figure 2:
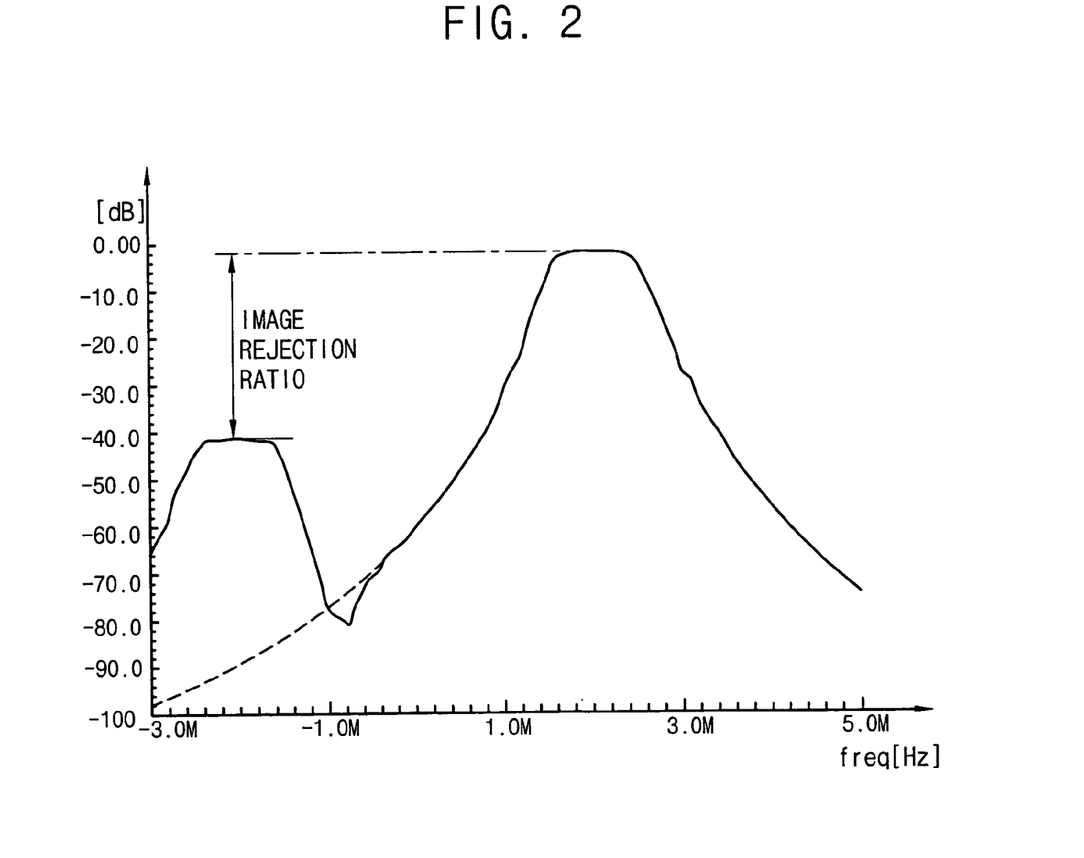
FIG. 2 shows a simulation result of a frequency response for an image rejection filter in a low-IF (Intermediate Frequency) receiver.

FIG. 2 shows a simulation result of a frequency response of an image rejection filter used in a low-IF (Intermediate Frequency) receiver. Referring to FIG. 2, a dotted line represents a frequency response when intermediate frequency (IF) signals input by an image rejection filter have no gain and phase mismatch. On the other hand, a solid line in FIG. 2 represents a frequency response when the IF signals input by the image rejection filter have about 1% gain error and about 1° phase error. Here, an intermediate frequency IF is 2 MHz, and an image frequency is −2 MHz.

As shown in FIG. 2, an image rejection ratio IRR of the image rejection filter is increased to 40 dB from the dotted line due to IQ gain and phase mismatch. Thus, the IQ gain mismatch and the phase mismatch are desired to be minimized for an ideal frequency response (represented by the dotted line in FIG. 2).

Figure 3:
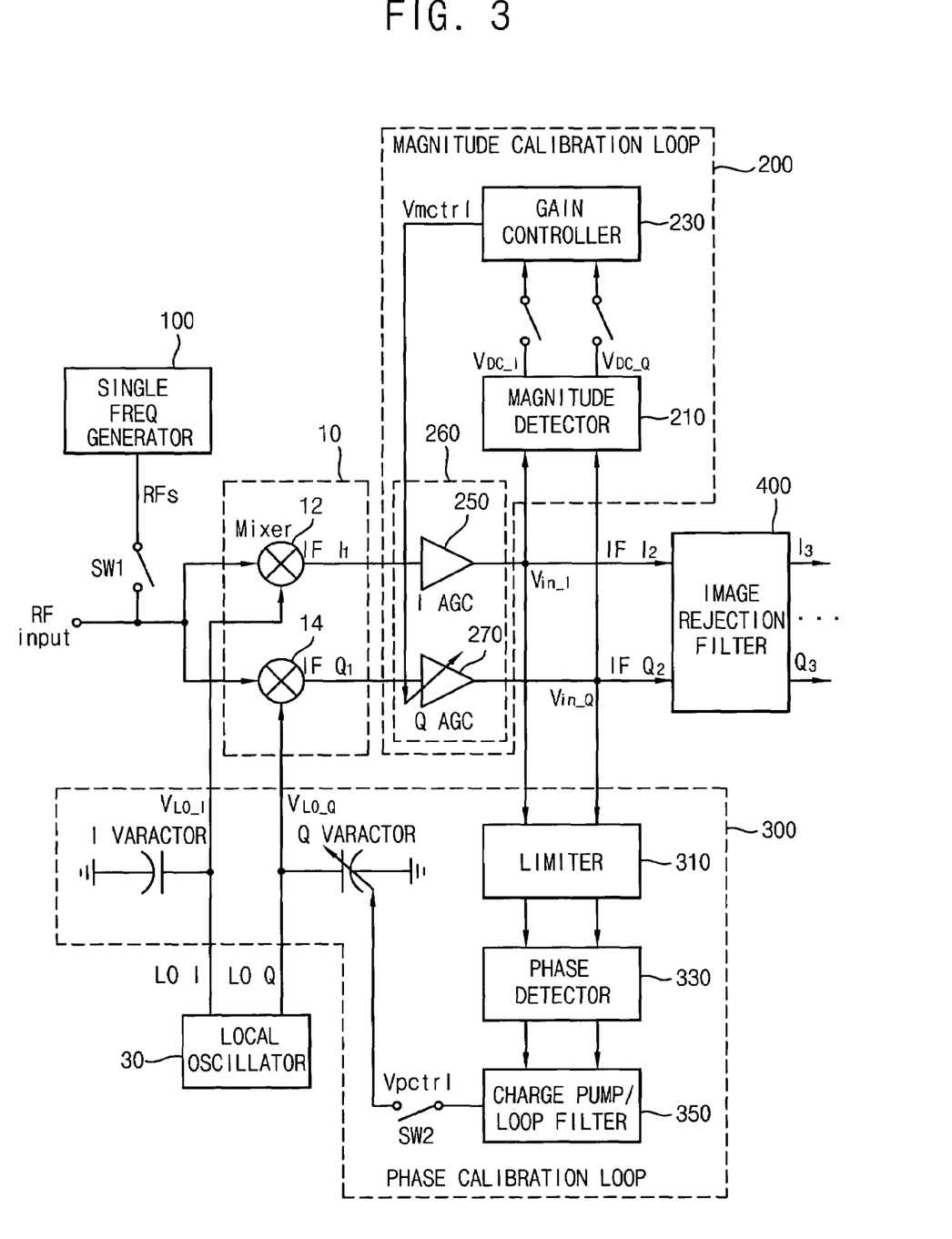
FIG. 3 is a block diagram of a RF receiver having magnitude and phase calibration loops, according to an example embodiment of the present invention.

FIG. 3 is a block diagram of a RF receiver having magnitude and phase calibration loops according to an example embodiment of the present invention. Referring to FIG. 3, the RF receiver includes a single frequency generator 100, a forward path 10 and 260, a magnitude calibration loop 200, a phase calibration loop 300, and an image rejection filter 400.

The single frequency generator 100 generates a RF signal RFs having a single predetermined frequency. The RF receiver operates in a calibration mode when a first switch SW1 is turned-on, and operates in a normal mode when the first switch SW1 is turned-off. In the calibration mode, the RF signal RFs from the single frequency generator 100 is used for calibration of the RF receiver.

The forward path 10 and 260 includes a mixer unit 10. The mixer unit 10 includes an I (in-phase) mixer 12 and a Q (quadrature-phase) mixer 14. The I mixer 12 down-converts an RF signal by mixing such an RF signal with an in-phase local oscillator signal LO I to generate a first intermediate frequency (IF) signal IF I1. The Q mixer 14 down-converts the RF signal by mixing such an RF signal with a quadrature-phase local oscillator signal LO Q to generate a second intermediate frequency (IF) signal IF Q1.

The quadrature-phase local oscillator signal LO Q lags in phase by 90 degrees with respect to the in-phase local oscillator signal LO I. Such local oscillator signals LO Q and LO I are generated by a local oscillator 30. The RF signal that is down-converted is an RF input signal during a normal mode, but is the RF signal RFs having the single predetermined frequency from the single frequency generator 100 during the calibration mode.

The magnitude calibration loop 200 includes a magnitude detector 210, a gain controller 230, and an automatic gain controlling unit 260. The magnitude calibration loop 200 minimizes a magnitude mismatch between the IF signals IF I2 and IF Q2 input by the image rejection filter 400. The magnitude calibration loop 200 detects a magnitude error between such IF signals IF I2 and IF Q2 to control gain in the automatic gain controlling unit 260 to form a kind of magnitude-locked loop.

The phase calibration loop 300 includes a limiter 310, a phase detector 330, a charge pump/loop filter 350, and varactors VLO_I and VLO_Q. The phase calibration loop 300 adjusts a phase relationship between the output signals LO I and LO Q of the local oscillator 30 from detecting a phase error between the IF signals IF I2 and IF Q2 input by the image rejection filter 400 to form a kind of delay-locked loop.

By minimizing the magnitude and phase mismatch between the IF signals IF I2 and IF Q2 input by the image rejection filter 400, an image rejection ratio of the RF receiver of FIG. 3 may be maximized. The magnitude calibration loop 200 and the phase calibration loop 300 operate during the calibration mode. The magnitude calibration loop 200 and the phase calibration loop 300 operate periodically for a refresh between normal modes.

The automatic gain controlling unit 260 includes a first automatic gain controller I AGC with a first gain amplifier 250 and a second automatic gain controller Q AGC with a second gain amplifier 270. The first gain amplifier 250 amplifies the first IF signal IF I1 with a first gain to generate the first IF signal IF I2 input by the image rejection filter 400. The second gain amplifier 270 amplifies the second IF signal IF Q1 with a second gain to generate the second IF signal IF Q2 input by the image rejection filter 400.

In one embodiment of the present invention, the second gain of the second gain amplifier 270 is variable and is adjusted by a control voltage Vmctrl from the magnitude calibration loop 200. Alternatively, the control voltage Vmctrl may also control the first gain of the first amplifier 250 in other embodiments of the present invention.

The image rejection filter 400 receives the IF signals IF I2 and IF Q2 having minimized gain/phase error, and removes image signals of such IF signals IF I2 and IF Q2 to generate an I3 signal and a Q3 signal, respectively. Such low-IF signals I3 and Q3 subsequently pass through an A/D converter (not shown) and may be converted to base band signals.

Figure 4:
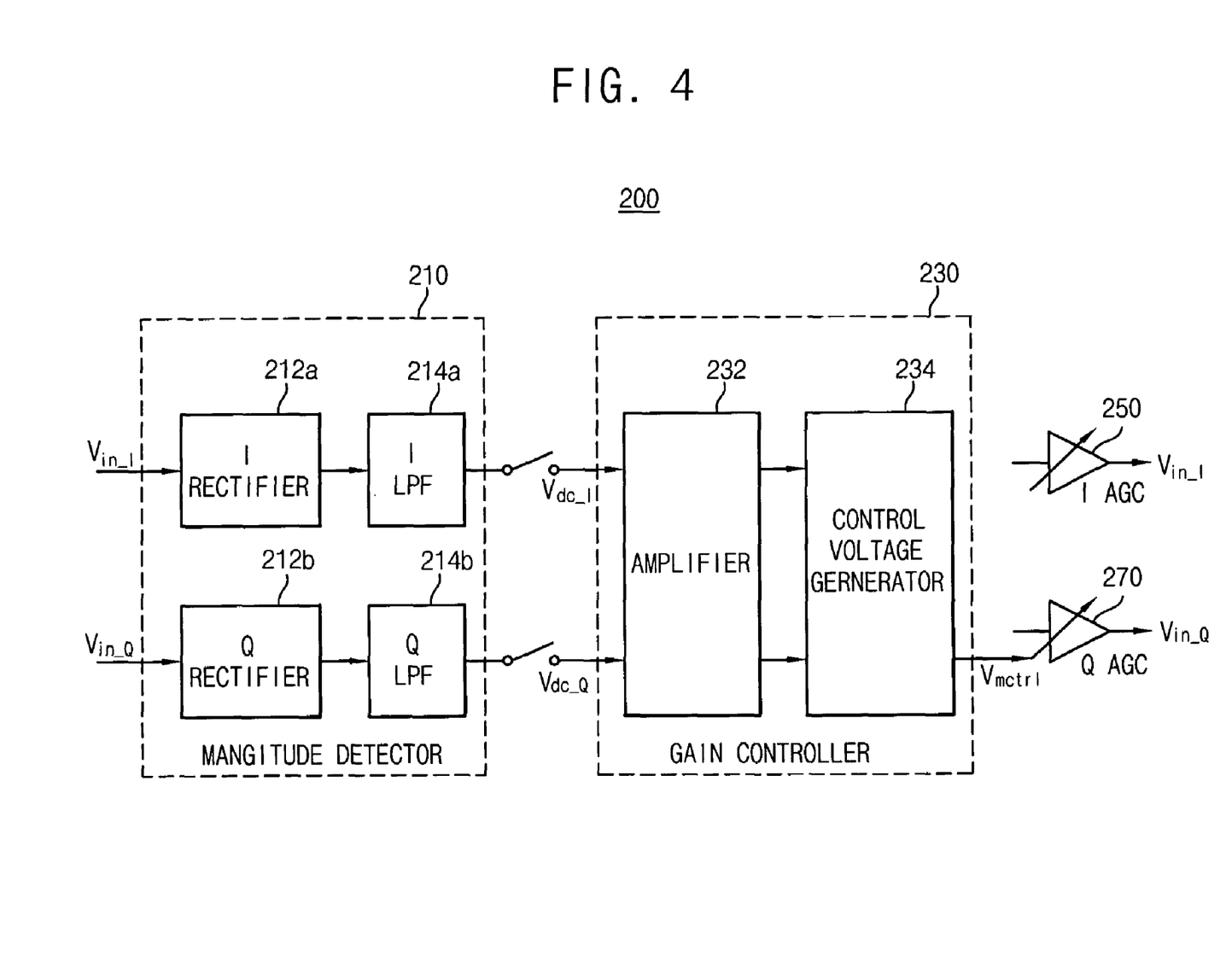
FIG. 4 is a block diagram of the magnitude calibration loop in FIG. 3, according to an example embodiment of the present invention.

FIG. 4 is a block diagram of the magnitude calibration loop 200 according to an example embodiment of the present invention. Referring to FIG. 4, the magnitude calibration loop 200 includes a magnitude detector 210 and a gain controller 230. The magnitude detector 200 includes an I (in-phase) rectifier 212a, an I LPF (in-phase low pass filter) 214a, a Q (quadrature-phase) rectifier 212b, and a Q LPF (quadrature low pass filter) 241b. The gain controller 230 includes an amplifier 230 and a control voltage generator 234.

The I rectifier 212a rectifies a signal Vin_I provided to an input terminal of the image rejection filter 400 from an AC signal to a DC signal, and the I LPF 214a performs low pass filtering on such a rectified DC signal to output a DC voltage Vdc_I representing a magnitude of the signal Vin_I. The Q rectifier 212b rectifies another signal Vin_Q provided to another input terminal of the image rejection filter 400 from an AC signal to a DC signal, and the Q LPF 214b performs low pass filtering on the rectified DC signal to output another DC voltage Vdc_Q representing a magnitude of the signal Vin_Q.

Figure 5:
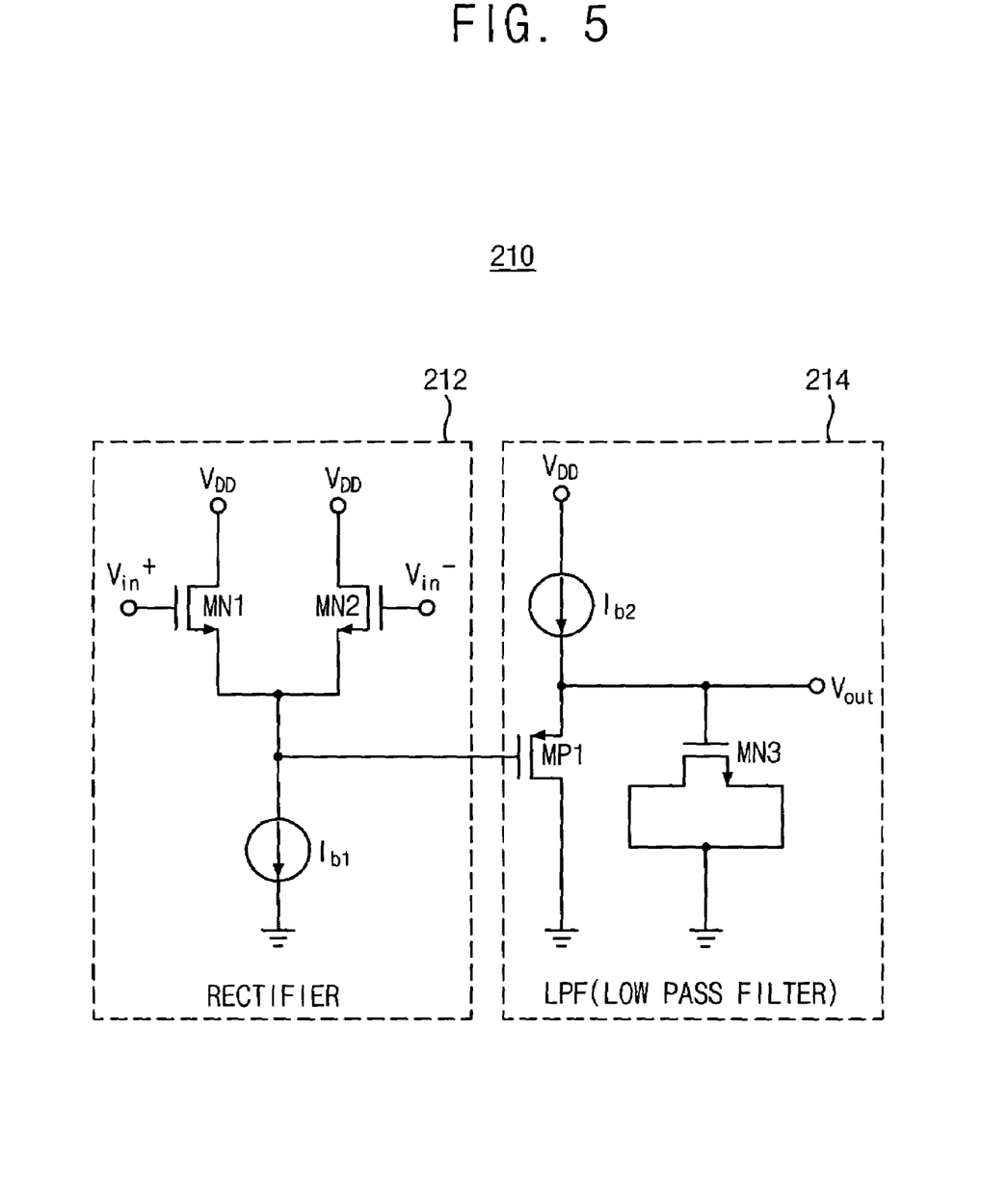
FIG. 5 is a circuit diagram of a rectifier and a low pass filter (LPF) in a magnitude detector of FIG. 4, according to an example embodiment of the present invention.

FIG. 5 shows a circuit diagram of a rectifier 212 and a low pass filter LPF 214 included in the magnitude detector 210 of FIG. 4 according to an example embodiment of the present invention. Referring to FIG. 5, the rectifier 212 (in case of the I rectifier 212a) receives the Vin_I signal and an inverted signal Vin_IB of the signal Vin_I as differential signals Vin+ and Vin−, respectively. The rectifier 212 (in case of the Q rectifier 212b) receives a Vin_Q signal and an inverted signal Vin_QB of the signal Vin_Q as differential signals Vin+ and Vin−, respectively.

The rectifier 212 includes NMOS transistors MN1 and MN2 having a common source configuration, and a constant current source providing a current level Ib1. The rectifier 212 in FIG. 5 is a full-wave rectifier circuit of a voltage follower type that outputs a full wave rectified signal at the common source node after each of the gates of the transistors MN1 and MN2 receives the differential signals Vin+ and Vin−.

The LPF 214 includes a bias current source providing a current level Ib2 and acting as a resistor, a PMOS transistor MP1, and a transistor MN3 acting as a capacitor. The LPF 214 of FIG. 5 is a first-order RC filter circuit having a pole at gm/C. In order to perform low pass filtering on a low-IF signal, gm/C is desire to be a relatively small value. Therefore, the bias current Ib2 is set to a relatively small value. In addition, the transistor MN3 is implemented using an NMOS transistor so as to reduce a design area of the capacitor.

Referring to FIGS. 4 and 5, a DC voltage VOUT from the LPF 214 is a relatively small signal and is amplified by the amplifier 232 to be provided to the control voltage generator 234. The control voltage generator 234 generates the control voltage Vmctrl based on a difference between the DC voltages Vdc_I from the I LPF and Vdc_Q from the Q LPF. For example, when Vdc_I is greater than Vdc_Q, the control voltage Vmctrl decreases, and when Vdc_I is less than Vdc_Q, the control voltage Vmctrl increases.

Figure 6:
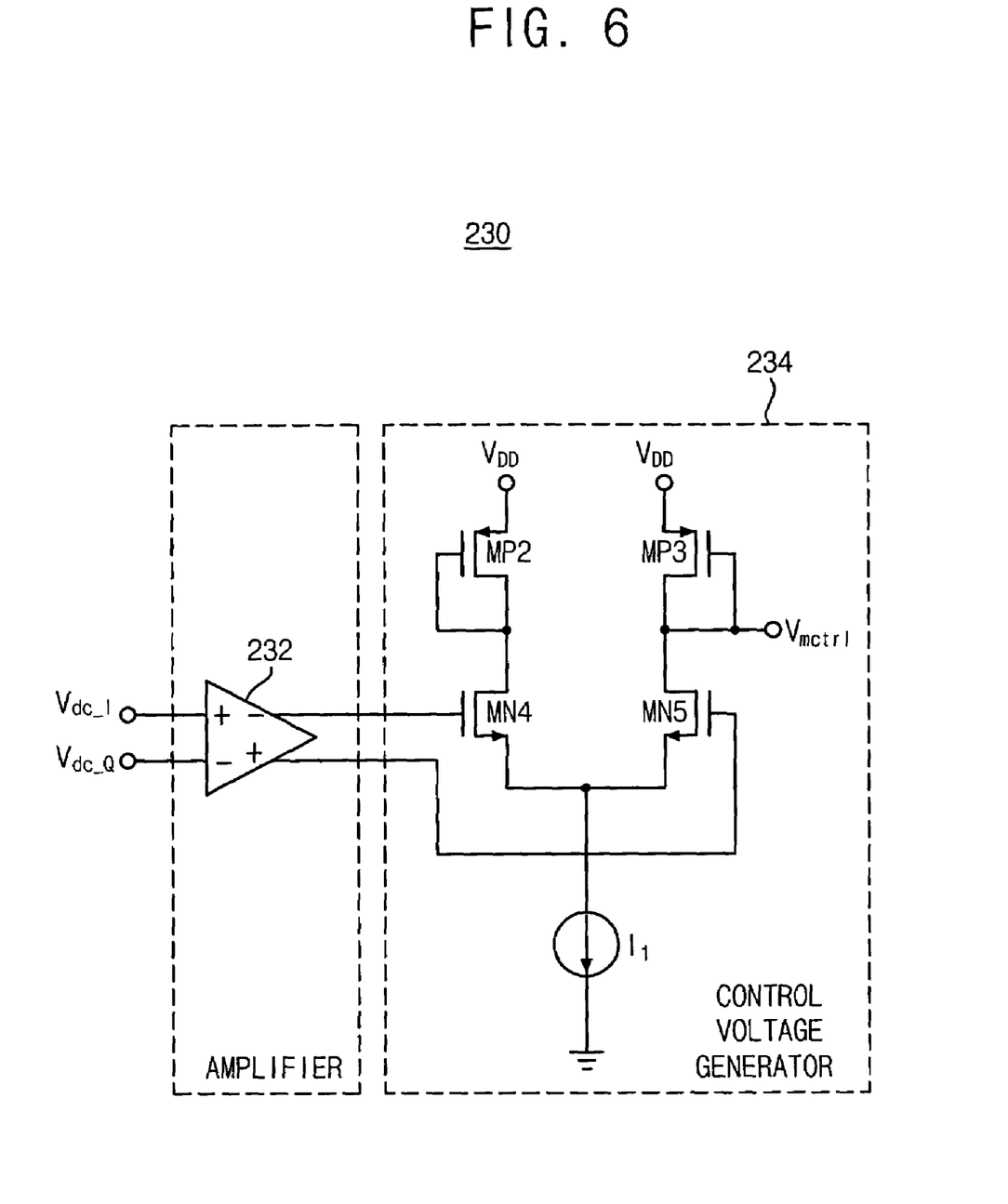
FIG. 6 is a circuit diagram of a gain controller in the magnitude calibration loop of FIG. 4, according to an example embodiment of the present invention.

FIG. 6 is a circuit diagram of the amplifier 232 and the control voltage generator 234 of FIG. 4, according to an example embodiment of the present invention. Referring to FIG. 6, the amplifier 232 is implemented with an op-amp in one embodiment of the present invention. The control voltage generator 234 includes PMOS transistors MP2 and MP3, each having a gate and a drain commonly coupled to each other, NMOS transistors MN4 and MN5 having a common source configuration, and a constant current source providing a current level I1.

The control voltage generator 234 operates differentially with Vdc_I and Vdc_Q being inputs to the op-amp 232. When Vdc_I is greater than Vdc_Q, a voltage provided to a gate of the NMOS transistor MN5 increases to decrease the control voltage signal Vmctrl. When Vdc_I is less than Vdc_Q, a voltage provided to a gate of the NMOS transistor MN4 increases to increase control voltage signal Vmctrl.

Figure 7:
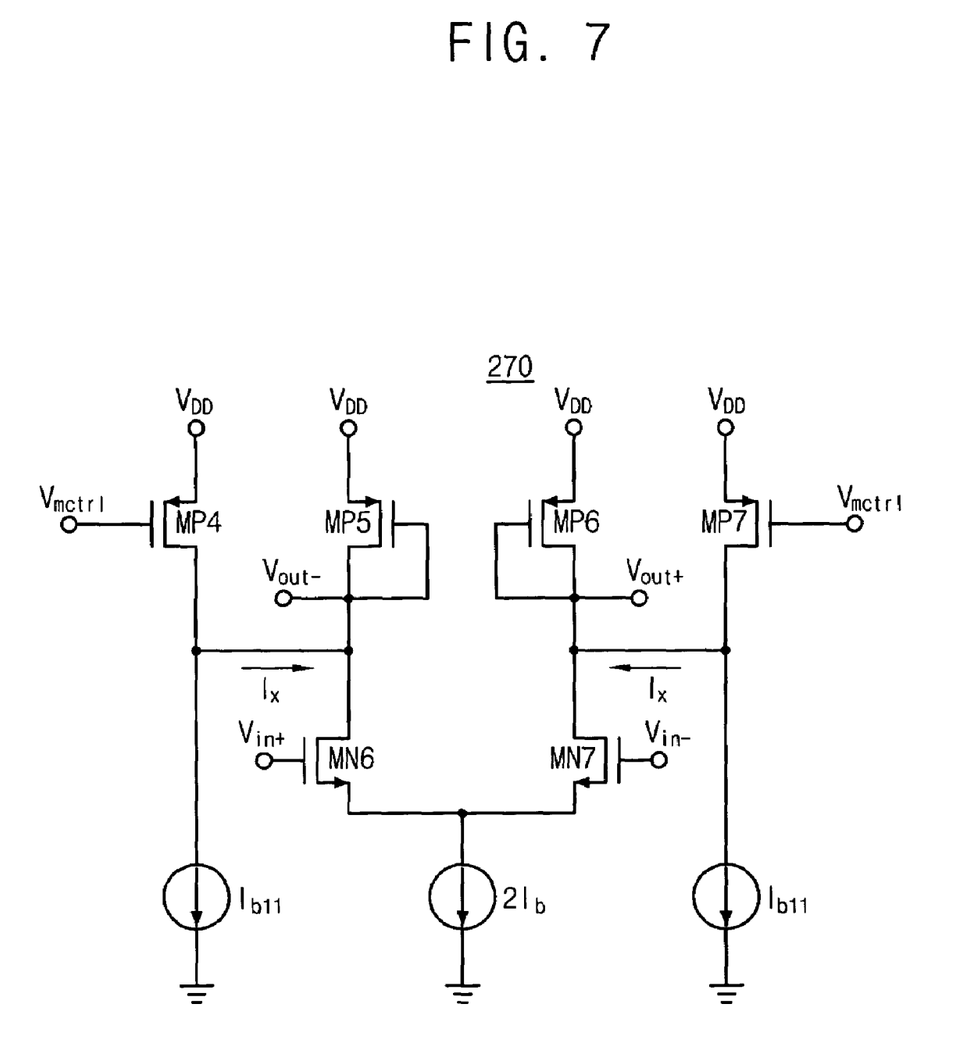
FIG. 7 is a circuit diagram of an automatic gain controller AGC of FIG. 4, according to an example embodiment of the present invention.

FIG. 7 is a circuit diagram of the gain amplifier 270 in FIG. 4, according to an example embodiment of the present invention. Referring to FIG. 7, the gain amplifier 270 includes PMOS transistors MP4, and MP7 having a gate where the control voltage Vmctrl is applied, NMOS transistors MN6 and MN7 having sources coupled together and having gates where differential input signals Vin+ and Vin– are applied, a PMOS transistor MP5 coupled between a power voltage VDD and a drain of the NMOS transistor MN6, and a PMOS transistor MP6 coupled between the power voltage VDD and a drain of the NMOS transistor MN7. The NMOS transistors MN6 and MN7 have sources coupled together and to a constant current source providing a current level 2Ib.

An output signal of the mixer 10 is applied as the differential input signal Vin+, and an inverted signal of such an output signal is applied as the differential input signal Vin–. In detail, a gain of the gain amplifier of FIG. 7 is represented by the following expression 1 as a ratio of an input transconductance $g_{mn}$ to a load transconductance $g_{mp}$.

$$A_v = \frac{g_{mn}}{g_{mp}} = \sqrt{\frac{2\mu_n C_{ox}(W/L)_N}{2\mu_p C_{ox}(W/L)_P}} \sqrt{\frac{I_b + I_x}{I_b}} \quad \langle \text{Expression 1} \rangle$$

When the control voltage Vmctrl decreases, $I_x$ increases and the gain $A_v$ increases. When the control voltage Vmctrl increases, $I_x$ decreases and the gain $A_v$ decreases.

Accordingly, when Vdc_I is greater than Vdc_Q, the control voltage Vmctrl decreases, and the gain of the gain amplifier 270 and thus the magnitude of the IF signal IF_Q2 increase. When Vdc_I is less than Vdc_Q, the control the voltage Vmctrl increases, and the gain of the gain amplifier 270 and thus the magnitude of the IF signal IF_Q2 decrease. As a result, magnitude mismatch may be minimized.

Figure 8:
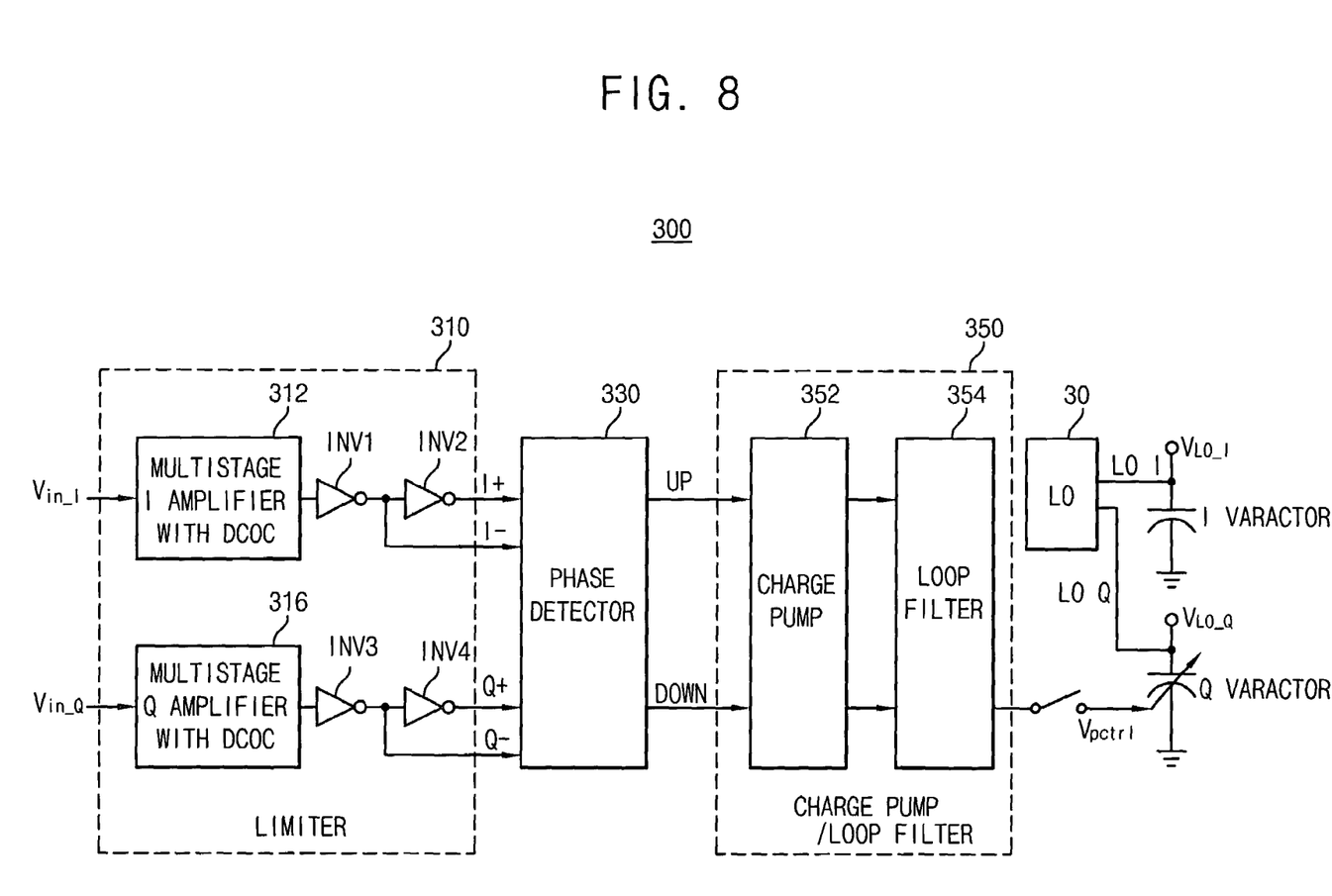
FIG. 8 is a block diagram of the phase calibration loop in FIG. 3, according to an example embodiment of the present invention.

FIG. 8 is a block diagram of the phase calibration loop 300, according to an example embodiment of the present invention. Referring to FIG. 8, the phase calibration loop 300 includes a limiter 310, a phase detector 330, a charge pump 352, a loop filter 354, an I (in-phase) varactor, and a Q (quadrature-phase) varactor.

The limiter 310 receives analog signals Vin_I and Vin_Q from the automatic gain controlling unit 260 to digitize the analog signals Vin_I and Vin_Q for driving the phase detector 330 using the digitized signals. The limiter 310 includes, for example, a multistage I (in-phase) amplifier 312 with a DCOC (Direct Current Offset Cancellation) circuit, inverters INV1 and INV2 coupled to an output terminal of the multistage I amplifier 312, a multistage Q (quadrature-phase) amplifier 316 with a DCOC circuit, and inverters INV3 and INV4 coupled to an output terminal of the multistage Q amplifier 316.

Figure 9:
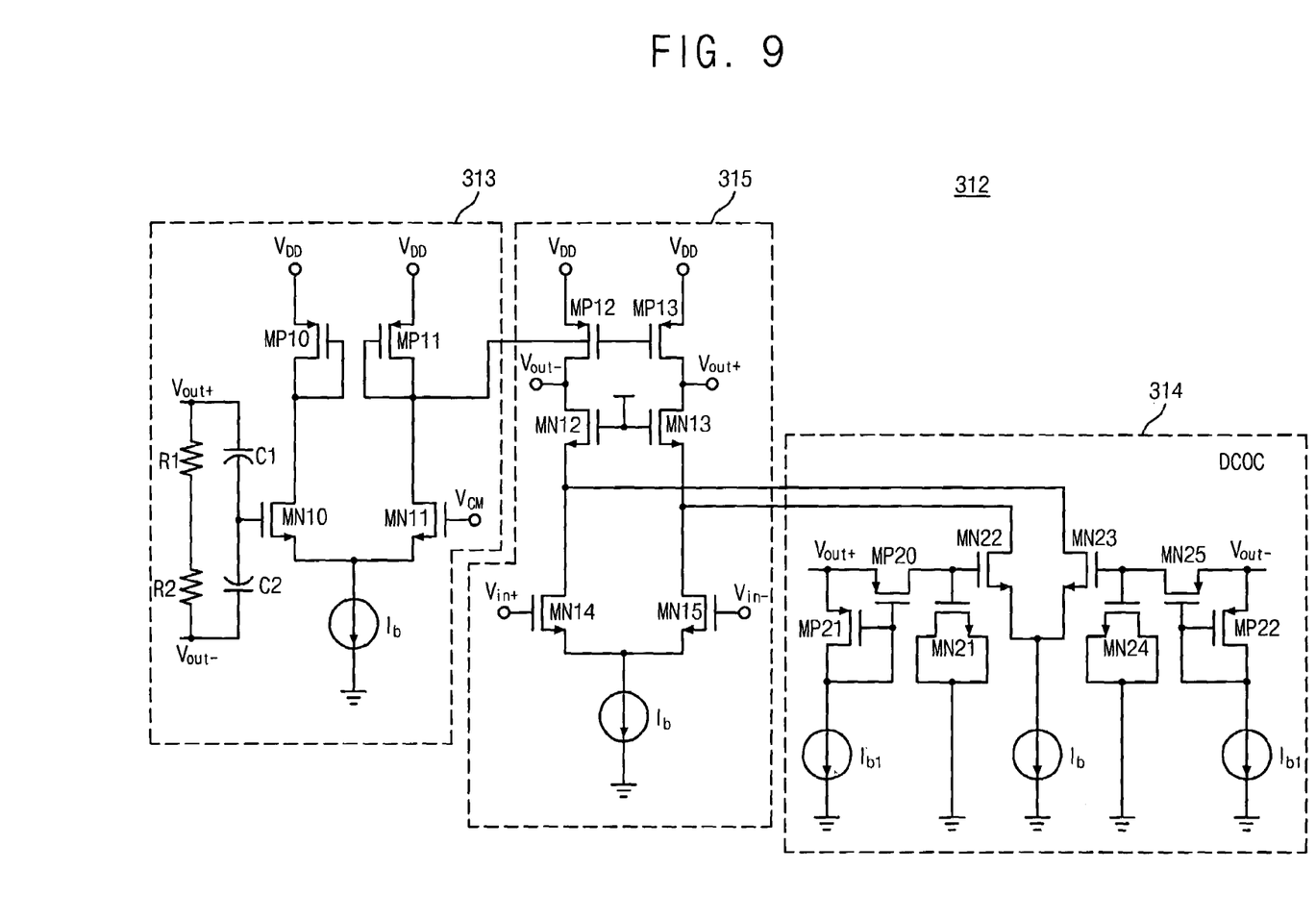
FIG. 9 is a circuit diagram of a multistage I amplifier with a DCOC circuit in a limiter of FIG. 8, according to an example embodiment of the present invention.

FIG. 9 is a circuit diagram of the multistage I amplifier 312 in the limiter 310 of FIG. 8, according to an example embodiment of the present invention. Referring to FIG. 9, the multistage I amplifier 312 includes a bias stage 313, an amplifier 315, and a DCOC (Direct Current Offset Cancellation) circuit 314. Alternatively, the limiter 310 may include multiple amplifiers, DCOC circuits, and bias stages in a multi-stage configuration.

Referring to FIG. 9, the bias stage 313 includes an NMOS transistor MN11 having a gate where a common mode voltage $V_{CM}$ is applied and an NMOS transistor MN10 having a gate coupled between capacitors C1 and C2. Resistors R1 and R2 are coupled in series across the capacitors C1 and C2. Voltages $V_{OUT}+$ and $V_{OUT}-$ are applied across the resistors R1 and R2 and the capacitors C1 and C2. The bias stage 313 also includes diode coupled PMOS transistors MP10 and MP11 coupled to drains of the NMOS transistors MN10 and MN11, respectively, and further includes a constant current source providing a current level Ib and coupled to the sources of the NMOS transistors MN10 and MN11.

The bias stage 313 provides a predetermined bias voltage to PMOS transistors MP12 and MP13 in the amplifier 315. The amplifier 315 also includes NMOS transistors MN12 and MN13 having gates coupled together, and includes NMOS transistors MN14 and MN15 having sources coupled together. The amplifier 315 in the example of FIG. 9 is a cascode amplifier for differentially amplifying differential input signals Vin+ and Vin– to output the amplified signals Vout+ and Vout–. The signal Vin+ corresponds to a signal Vin_I+ and the signal Vin– corresponds to an inverted signal Vin_I– of the signal Vin_I+. The multistage Q amplifier 316 may be implemented similarly and in that case, the signal Vin+ corresponds to a signal Vin_Q+ and the signal Vin– corresponds to an inverted signal Vin_Q– of the signal Vin_Q+.

The DCOC circuit 314 includes an NMOS transistor MN22 having a drain coupled to a drain of the NMOS transistor MN15, and includes an NMOS transistor MN23 having a drain coupled to a drain of the NMOS transistor MN14. The NMOS transistors MN22 and MN23 have sources coupled together.

The DCOC circuit 314 also includes an NMOS transistor MN21 used as a capacitor coupled to a gate of the NMOS transistor MN22, a diode coupled PMOS transistor MP21, and a PMOS transistor MP20 coupled between a gate of the NMOS transistor MN22 and an output terminal having Vout+ generated thereon. The DCOC circuit 314 further includes an NMOS transistor MN24 used as a capacitor coupled to a gate of the NMOS transistor MN23, a diode coupled PMOS transistor MP22, and a PMOS transistor MP25 coupled between a gate of the NMOS transistor MN23 and an output terminal having Vout– generated thereon.

The sources of the NMOS transistors MN22 and MN23 are coupled to a constant current source providing a current level Ib. A drain of the PMOS transistor MP21 is coupled to a constant current source providing a current level Ib1, and a drain of the PMOS transistor MP22 is coupled to a constant current source providing a current level Ib1.

The DCOC circuit 314 performs a limiter operation whereby the signal Vout+ is limited to be below a first voltage level and the signal Vout– is limited to be below a second voltage level. Thus, the DCOC circuit 314 prevents the amplifier 315 from being saturated due to a DC offset resulting from mixing local oscillator signals from the local oscillator 30 in the mixers 12 and 14.

Figure 10:
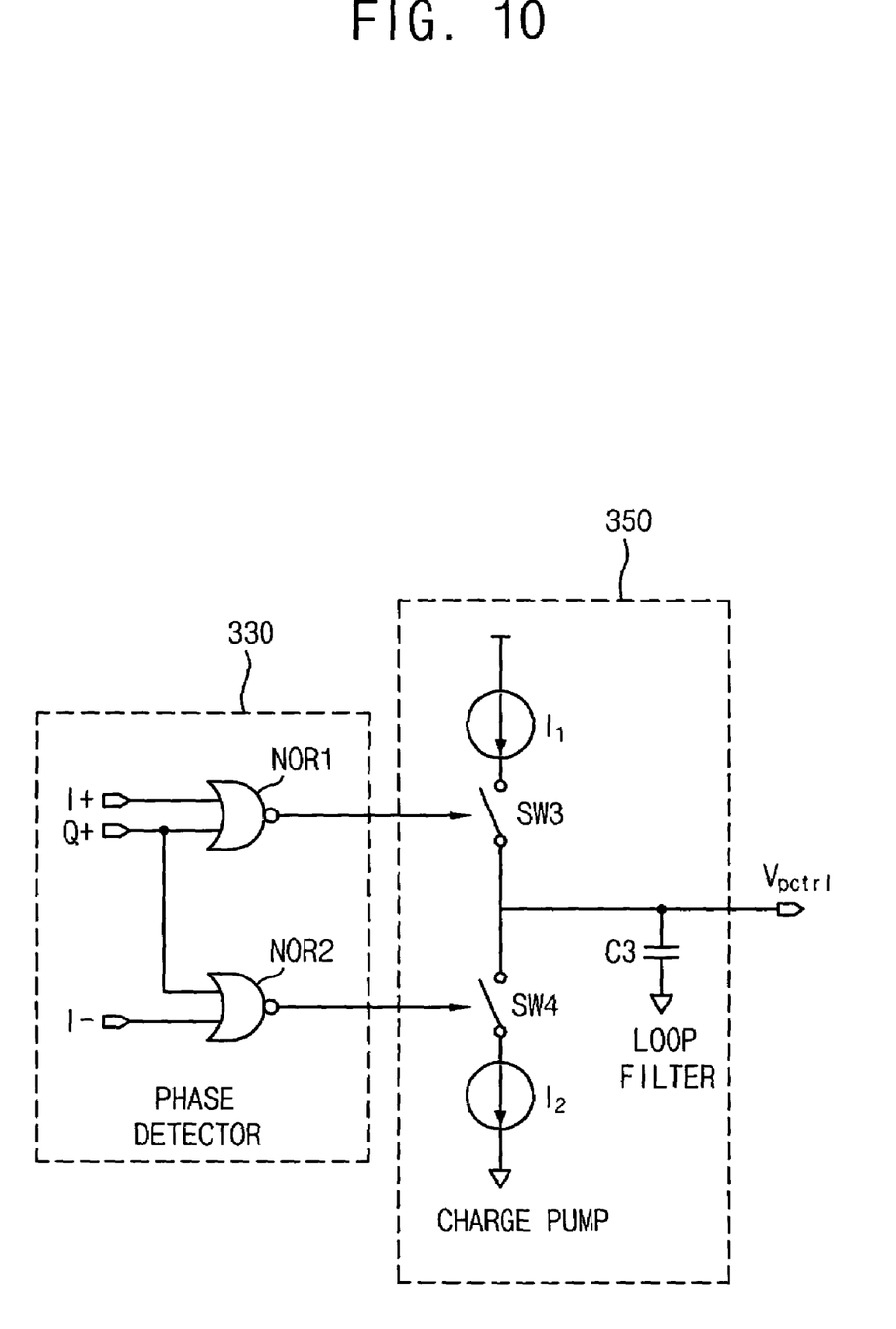
FIG. 10 is a circuit diagram of a phase detector and a charge pump/loop filter of FIG. 8, according to an example embodiment of the present invention.

FIG. 10 is a circuit diagram of the phase detector 330 and the charge pump/loop filter 350 of FIG. 8, according to an example embodiment of the present invention. Referring to FIG. 10, the phase detector 330 receives signals I+, I–, Q+ and Q– from the limiter 310 to detect a phase error.

The phase detector 330 includes a first NOR gate NOR1 where the signals I+ and Q+ are input for performing a logic "NOR" operation on the signals I+ and Q+. The phase detector 330 also includes a second NOR gate NOR2 where the signals I– and Q+ are input for performing the logic "NOR" operation on the signals I– and Q+.

Figure 11:
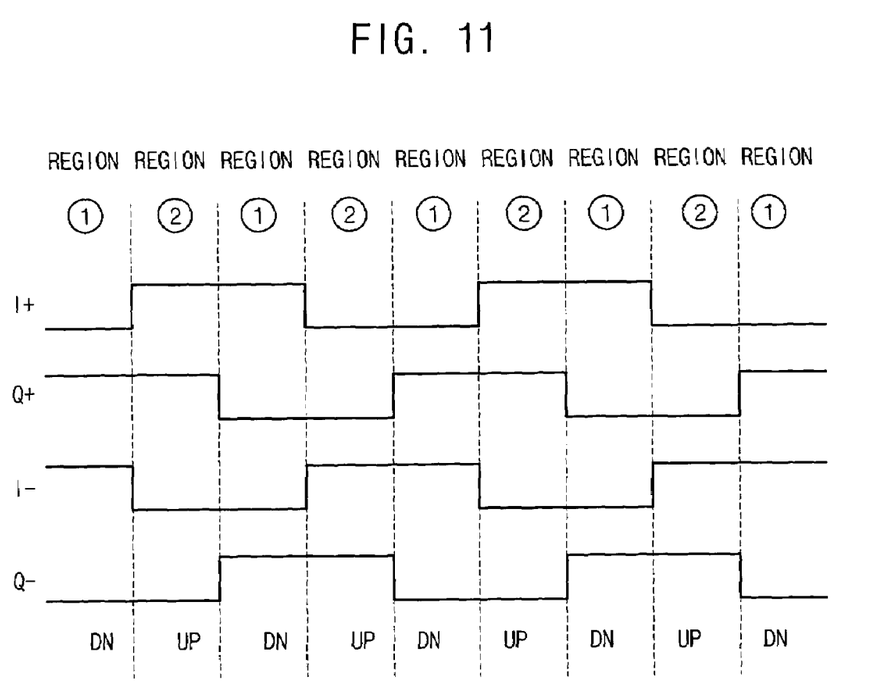
FIG. 11 is a timing diagram of signals during operation of the phase detector of FIG. 10, according to an example embodiment of the present invention.

The charge pump 350 includes a first constant current source providing a current level I1, a first switch SW3, a second switch SW4, and a second constant current source providing a current level I2. The loop filter 354 is implemented with a capacitor C3. FIG. 11 is a timing diagram of example signals I+, I–, Q+ and Q– from the limiter 310.

Referring to FIGS. 10 and 11, the second switch SW4 of the charge pump is turned-on at a region 1 to decrease charge storage in the capacitor C3 for lowering a control voltage Vpctrl. The first switch SW3 of the charge pump is turned-on at a region 2 to increase charge storage in the capacitor C3 to boost the control voltage Vpctrl.

Further referring to FIG. 11, the phase detector 330 compares the lengths of regions 1 and 2 to adjust a length difference (i.e. a phase error) between such regions 1 and 2 along the horizontal axis (i.e. a time axis). When the length difference (i.e. a phase error) between the regions 1 and 2 is equal to '0', a phase difference between the regions 1 and 2 corresponds to 90°.

The charge pump 352 and the loop filter 354 generate a control voltage Vpctrl that is used to adjust a capacitance value of the Q varactor based on the phase error. The control voltage Vpctrl proportional to the phase error between the signals I+ and Q+ increases when the phase difference between the signals Q+ and I+ is less than or equal to 90°, and decreases when the phase difference between the signals Q+ and I+ is more than 90°.

Figure 12:
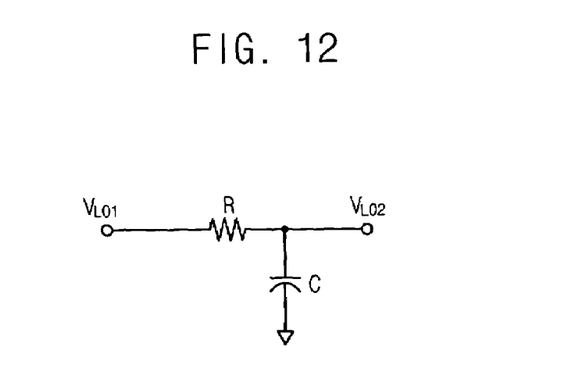
FIG. 12 is a diagram of an equivalent circuit of a local oscillator of FIG. 3, according to an example embodiment of the present invention.

FIG. 12 shows a circuit diagram of an equivalent circuit of the local oscillator 30 of FIG. 3, according to an example embodiment of the present invention. Referring to FIG. 12, a load capacitor C in a path of the local oscillator LO 30 and a load resistor R of the local oscillator LO 30 are included for a first-order RC LPF model.

The first order RC LPF generates a RC delay whose phase depends on the RC delay as expressed in the following expression 2.

$$\phi = -\tan^{-1}(wCR) \rightarrow \frac{d\phi}{dC} = \frac{wR}{1+wCR^2} \quad \text{(Expression 2)}$$

When the voltage Vpctrl decreases and the capacitance value of the Q varactor is increased, the voltage signal LO Q is outputted from the local oscillator 30 with higher phase lag. When the voltage Vpctrl increases and the capacitance value of the Q varactor is decreased, the voltage signal LO Q is outputted from the local oscillator 30 with higher phase lead.

As a result, in the phase calibration loop 300, when the phase difference between the voltage signals I and Q is more than 90°, a phase of the output signal LO Q of the local oscillator LO 30 is decreased. When the phase difference between the voltage signals I and Q is less than 90°, the phase of the output signal LO Q of the local oscillator LO 30 is increased. Thus, the phase calibration loop 300 minimizes the phase mismatch by locking the phase difference to be substantially 90°.

In this manner, analog circuit elements are used for calibration of the magnitude and phase relationships of the IF signals for reduced chip area and power consumption. In addition, embodiments of the present invention provide a unique combination of adjusting at least one local oscillator signal before transmission through the mixers for calibrating phase and adjusting at least one IF signal after transmission from the mixers for calibrating magnitude. Such adjusting of both types of signals may result in improved calibration. With such calibration of the magnitude and phase relationship of the IF signals IF I2 and IF Q2 reaching the image rejection filter 400, the image rejection ratio IRR is improved.

While the example embodiments of the present invention and their advantages have been described in detail, it should be understood that various changes, substitutions and alterations may be made herein without departing from the scope of the invention.

What is claimed is:
1. An intermediate frequency receiver, comprising:
   mixers for generating first and second IF (intermediate frequency) signals from a RF (radio frequency) signal and local oscillator signals;
   a magnitude calibration loop for adjusting a respective gain for each of at least one of the first and second IF signals generated after transmission from the mixers, depending on a difference between magnitudes of the first and second IF signals; and
   a phase calibration loop for adjusting a respective phase of each of at least one of the local oscillator signals generated before transmission through the mixers, depending on a phase difference between the first and second IF signals;
   wherein the phase calibration loop includes:
   a limiter for limiting a DC offset of the IF signals that are amplified;
   a phase detector for determining the phase difference between the IF signals that are amplified; and
   a charge pump for generating a control voltage depending on the phase difference between the IF signals that are amplified.
2. The intermediate frequency receiver of claim 1, wherein the phase calibration loop further includes:
   at least one varactor coupled to a local oscillator for generating the local oscillator signals;
   wherein the control voltage from the charge pump controls the at least one varactor for adjusting a phase of at least one of the local oscillator signals depending on the control voltage.
3. The intermediate frequency receiver of claim 1, further comprising:
   a single frequency RF signal generator for generating the RF signal having a single predetermined frequency; and
   a switch that is closed for coupling the RF signal from the single frequency RF signal generator to the mixers during a calibration mode.
4. The intermediate frequency receiver of claim 1, wherein the mixers include:
   a first mixer for mixing the RF signal with an in-phase local oscillator signal to generate the first IF signal; and
   a second mixer for mixing the RF signal with a quadrature-phase local oscillator signal to generate the second IF signal.
5. The intermediate frequency receiver of claim 4, further comprising:
   a local oscillator for generating the in-phase and quadrature-phase local oscillator signals.
6. The intermediate frequency receiver of claim 1, further comprising:
   an image rejection filter that receives the first and second IF signals after being amplified for removing image frequency components from the IF signals.
7. The intermediate frequency receiver of claim 1, wherein the magnitude calibration loop includes:
   a magnitude detector for generating a respective DC voltage representing a respective magnitude of each of the IF signals; and
   a gain controller for generating a control signal for controlling the respective gain for each of at least one of the first and second IF signals from comparing the respective DC voltages.
8. The intermediate frequency receiver of claim 7, further comprising:
   a first mixer for mixing the RF signal with an in-phase local oscillator signal to generate the first IF signal;

a second mixer for mixing the RF signal with a quadrature-phase local oscillator signal to generate a second IF signal;

a first gain amplifier for amplifying the first IF signal with a first gain; and a second gain amplifier for amplifying the second IF signal with a second gain;

wherein the control signal from the gain controller is coupled to the second gain amplifier for adjusting the second gain depending on the control signal.

9. The intermediate frequency receiver of claim 1, wherein the magnitude calibration loop for providing the respective gains is disposed before any filtering of the IF signals.

10. An intermediate frequency receiver, comprising:

mixers for generating first and second IF (intermediate frequency) signals from a RF (radio frequency) signal and local oscillator signals;

means for adjusting a respective gain for each of at least one of the first and second IF signals generated after transmission from the mixers, depending on a difference between magnitudes of the first and second IF signals; and means for adjusting a respective phase for each of at least one of the local oscillator signals generated before transmission through the mixers, depending on a phase difference between the first and second IF signals, wherein the means for adjusting the respective phase includes:

a limiter for limiting a DC offset of the IF signals that are amplified;

a phase detector for determining the phase difference between the IF signals that are amplified; and a charge pump for generating a control voltage depending on the phase difference between the IF signals that are amplified.

11. The intermediate frequency receiver of claim 10, wherein the mixers include:

a first mixer for mixing the RF signal with an in-phase local oscillator signal to generate the first IF signal; and a second mixer for mixing the RF signal with a quadrature-phase local oscillator signal to generate the second IF signal.

12. The intermediate frequency receiver of claim 11, further comprising:

a local oscillator for generating the in-phase and quadrature-phase local oscillator signals.

13. The intermediate frequency receiver of claim 10, further comprising:

an image rejection filter that receives the first and second IF signals after being amplified for removing image frequency components from the IF signals.

14. A method for down-converting an RF (radio frequency) signal, comprising:

generating first and second IF (intermediate frequency) signals from mixing the RF signal and local oscillator signals;

adjusting a respective gain for each of at least one of the first and second IF signals after the mixing, depending on a difference between magnitudes of the first and second IF signals;

adjusting a respective phase for each of at least one of the local oscillator signals before the mixing, depending on a phase difference between the first and second IF signals;

limiting a DC offset of the IF signals that are amplified;

determining the phase difference between the IF signals that are amplified; and generating a control voltage depending on the phase difference between the IF signals that are amplified.

15. The method of claim 14, further includes:

adjusting a phase of at least one of the local oscillator signals by controlling a respective varactor in the path of the local oscillator signal depending on the control voltage.

16. The method of claim 14, further comprising:

generating the RF signal having a single predetermined frequency; and using the RF signal having the single predetermined frequency during a calibration mode.

17. The method of claim 14, further comprising:

mixing the RF signal with an in-phase local oscillator signal to generate the first IF signal; and mixing the RF signal with a quadrature-phase local oscillator signal to generate the second IF signal.

18. The method of claim 14, further comprising:

removing image frequency components from the IF signals after being amplified.

19. The method of claim 14, further comprising:

generating a respective DC voltage representing a respective magnitude of each of the IF signals; and generating a control signal for controlling the respective gain for each of at least one of the first and second IF signals from comparing the respective DC voltages.

20. The method of claim 19, further comprising:

amplifying the first IF signal with a first gain and amplifying the second IF signal with a second gain; and adjusting the second gain depending on the control signal.

21. The method of claim 14, wherein the first and second IF signals are amplified with the respective gains before any filtering of the IF signals.

* * * * *